United States Patent
Englebert

(10) Patent No.: US 10,105,770 B2
(45) Date of Patent: Oct. 23, 2018

(54) METHOD FOR SELECTING A MILLING CUTTER FOR MACHINING

(71) Applicant: SAFRAN AERO BOOSTERS S.A., Herstal (Milmort) (BE)

(72) Inventor: Eric Englebert, Villers-le-Bouillet (BE)

(73) Assignee: SAFRAN AERO BOOSTERS S.A., Herstal (Milmort) (BE)

( * ) Notice: Subject to any disclaimer, the term of this patent is extended or adjusted under 35 U.S.C. 154(b) by 0 days.

(21) Appl. No.: 15/411,271

(22) Filed: Jan. 20, 2017

(65) Prior Publication Data

US 2017/0209945 A1 Jul. 27, 2017

(30) Foreign Application Priority Data

Jan. 21, 2016 (BE) .................................. 2016/5045

(51) Int. Cl.
- *B23C 5/00* (2006.01)
- *B23C 5/04* (2006.01)
- *B23C 9/00* (2006.01)

(52) U.S. Cl.
CPC . *B23C 5/04* (2013.01); *B23C 9/00* (2013.01)

(58) Field of Classification Search
CPC ...... B23C 2210/0407; B23C 2210/045; B23C 2210/0485; B23C 2210/0492; B23C 2210/40
See application file for complete search history.

(56) References Cited

U.S. PATENT DOCUMENTS

| | | | |
|---|---|---|---|
| 4,963,059 A * | 10/1990 | Hiyama | B23C 5/003 407/11 |
| 6,997,651 B2 * | 2/2006 | Kawai | B23C 5/10 407/53 |
| 2007/0154272 A1 * | 7/2007 | Wells | B23C 5/10 407/54 |
| 2007/0286691 A1 * | 12/2007 | Glimpel | B23C 5/10 407/54 |
| 2011/0123280 A1 * | 5/2011 | Hobohm | B23C 5/1081 407/34 |
| 2011/0217132 A1 | 9/2011 | Wells et al. | |
| 2014/0227049 A1 * | 8/2014 | Budda | B23C 5/10 407/54 |
| 2014/0227050 A1 * | 8/2014 | Budda | B23C 5/10 407/54 |
| 2015/0158095 A1 * | 6/2015 | Strasmann | B23C 5/003 409/131 |
| 2015/0251254 A1 * | 9/2015 | Mutlu | B23C 5/10 409/131 |
| 2016/0297012 A1 * | 10/2016 | Davis | B23C 5/10 |
| 2017/0008098 A1 * | 1/2017 | Kuroda | B23C 5/10 |

FOREIGN PATENT DOCUMENTS

EP 2100683 A1 9/2009

OTHER PUBLICATIONS

International Search Report and Written Opinion dated Sep. 29, 2016, issued in corresponding Belgian Application No. 2016/5045, filed Jan. 21, 2016, 8 pages.

* cited by examiner

*Primary Examiner* — Will Fridie, Jr.
(74) *Attorney, Agent, or Firm* — Christensen O'Connor Johnson Kindness PLLC

(57) ABSTRACT

A method for selecting a milling cutter, which method makes it possible to select a milling cutter on the basis of a part to be machined such that the cutting force is constant while the part is being machined.

12 Claims, 2 Drawing Sheets

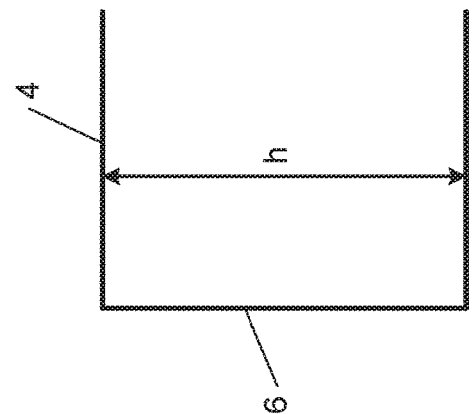
Fig.2
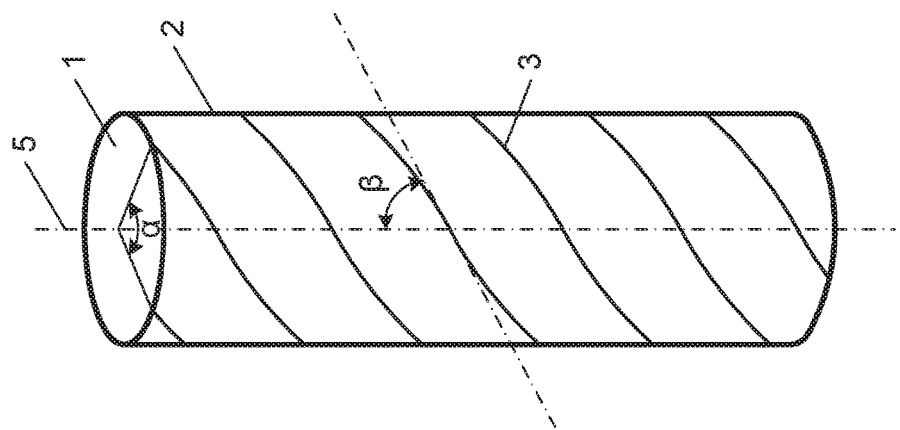
Fig.1
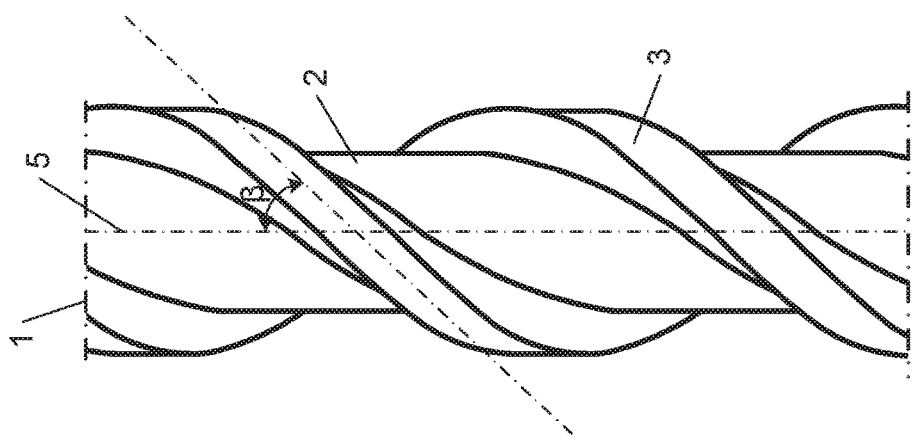

METHOD FOR SELECTING A MILLING CUTTER FOR MACHINING

FIELD OF THE DISCLOSURE

According to a first aspect, embodiments of the present disclosure relate to a method for selecting a milling cutter (for machining) on the basis of a part to be machined. According to a second aspect, embodiments of the present disclosure relate to a milling cutter for lateral milling.

BACKGROUND

A milling cutter known from the prior art comprises a plurality of cutting edges. The rotation of the milling cutter makes it possible to machine a part owing to contact with the edges. When laterally milling a part, the number of edges of the milling cutter engaging with the part varies each time an edge comes into contact or moves out of contact with the part, which causes a change in cutting force.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to a first aspect, one of the objects of the present disclosure is that of providing a method that makes it possible to select a milling cutter on the basis of a part to be machined such that the cutting force is constant while the part is being machined. For this purpose, a method is provided for selecting a milling cutter on the basis of a part to be machined, the milling cutter comprising:
a cylinder having a circular cross section of radius R and having an axis of rotation;
a plurality of cutting edges in a number M, arranged along parallel helical lines extending along an outer surface of the cylinder, the edges defining, together with the direction of the axis of the cylinder, a helix angle $\beta$, the edges enclosing constant angles $\alpha$ in a plane that is perpendicular to the axis such that $\alpha=360°/M$;
the method further comprising:
providing a part having a side;
determining a height h of the side; and
selecting a milling cutter having values of $\alpha$, $\beta$ and R such that the following equation is satisfied:

$$\frac{tg(\beta)}{R\,\alpha} = \frac{\text{integer}}{h}$$

According to different embodiments, which can be taken together or separately:
the number of cutting edges of the milling cutter is between 1 and 10;
the number of cutting edges of the milling cutter is between 2 and 6;
the helix angle $\beta$ is between 10° and 80°; and
the helix angle $\beta$ is between 20° and 70°.

According to a second aspect, a milling arrangement is provided comprising a milling cutter and a part, said milling cutter permitting lateral milling of said part, comprising a milling cutter and a part, said milling cutter permitting lateral milling of said part, said milling cutter further comprising:
a cylinder having a circular cross section of radius R and having an axis of rotation;
a plurality of cutting edges in a number M, arranged along parallel helical lines extending along an outer surface of the cylinder, the edges defining, together with the direction of the axis of the cylinder, a helix angle $\beta$, the edges enclosing constant angles $\alpha$ in a plane that is perpendicular to the axis such that $\alpha=360°/M$;
said part having a side facing said milling cutter that has a height h measured in parallel with the axis of the cylinder of the milling cutter,
wherein the values of $\alpha$, $\beta$ and R satisfy the following equation:

$$\frac{tg(\beta)}{R\,\alpha} = \frac{\text{integer}}{h}$$

It is possible to show that these values of $\alpha$, $\beta$ and R relative to h are such that, each time an edge comes into contact with the part, another edge moves out of contact with the part. The cutting force therefore remains constant during the milling process.

Throughout this document, the angles are given in radians except where they are explicitly stated in degrees (°).

According to different embodiments, which can be taken together or separately:
the number of cutting edges of the milling cutter is between 1 and 10;
the number of cutting edges of the milling cutter is between 2 and 6;
the helix angle $\beta$ is between 10° and 80°; and
the helix angle $\beta$ is between 20° and 70°.

In some embodiments, the side of the part facing the milling cutter is substantially planar.

In some embodiments, the side of the part facing the milling cutter is parallel to the axis.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 is a perspective view of a portion of a milling cutter of an arrangement according to an aspect of the disclosure;

FIG. 2 schematically shows a milling arrangement according to an aspect of the disclosure.

DETAILED DESCRIPTION

Figure 3:
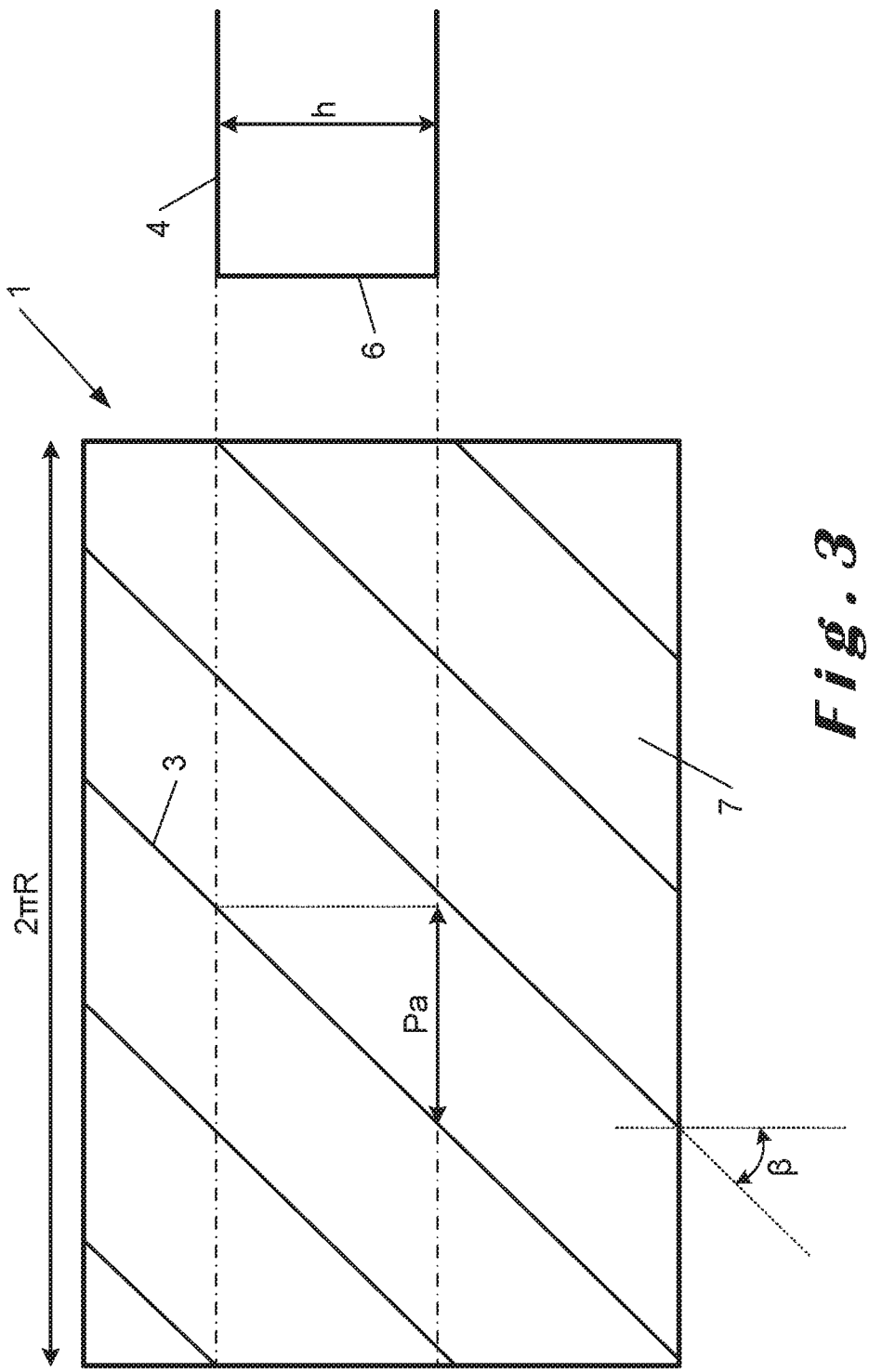
FIG. 3 schematically shows a surface of the milling cutter included in the milling arrangement, flattened on a plane, and the part to be milled.

Embodiments of the present disclosure are described on the basis of specific examples and with reference to the drawings, but such embodiments should not be limited thereby. The drawings described are only schematic and are not limiting.

In the context of the present document, the terms "first" and "second" are used only to differentiate the different elements and do not imply an order between these elements.

In the drawings, identical or similar elements may have the same reference signs.

FIG. 1 shows a milling cutter 1 according to an aspect of the disclosure, which comprises a straight circular cylinder 2 having an axis of rotation 5 and an outer surface, and M cutting edges 3 arranged along parallel helical lines extending along the outer surface of the cylinder 2.

In FIG. 1, M is equal to 2. M is an integer. M in some embodiments is between 1 and 10. M in other embodiments is between 2 and 6. In the present document, the expression "A is between B and C" means that A may assume values between B and C, including B and C.

A helix angle, which is the angle between the tangent at an edge 3 and the direction of the axis 5 of the cylinder, is denoted by β. The helix angle, β, in some embodiments is between 10° and 80°. The helix angle, β, in other embodiments is between 20° and 70°.

FIG. 2 schematically shows a milling arrangement according to an aspect of the disclosure, comprising the milling cutter 1 and the part 4 intended to be machined by the milling cutter 1. The milling cutter 1 is shown having the straight circular cylinder 2 and the M cutting edges 3. The edges 3 enclose a constant angle α, α being measured on the axis 5, in a plane perpendicular to the axis. α is related to the number M of edges 3 of the milling cutter by the equation:

$$\alpha = \frac{2\pi}{M}$$

A radius of a cross section of the cylinder 1 perpendicular to the axis 5 is denoted by R.

The part 4 intended to be machined by the milling cutter 1, by placing the milling cutter 1 into contact with the part 4 on a side 6 of the part 4. This side 6 of the part 4 in contact with the milling cutter 1 in some embodiments is planar and parallel to the axis 5. This side 6 of the part 4 has a height h measured in parallel with the axis 5.

The height of the milling cutter 1, measured in parallel with the axis 5, is greater than h.

The milling cutter 1 can be mounted on a spindle (not shown) using a sleeve or a mandrel (shown). The spindle rotates the milling cutter 1 about the axis 5.

FIG. 3 schematically shows a surface of the milling cutter 1 flattened on a plane such that the outer surface of the cylinder 2 becomes a rectangle 7. The perimeter of a cross section of the cylinder 2, equal to 2πR, corresponds to the length of a side of the rectangle 7. The length Pa of an arc of a circle swept by an edge 3 along the height h is such that $$\tan(\beta) = \frac{Pa}{h}$$

The angle γ in the centre made by this arc of a circle swept by an edge 3 along the height h is equal to $$\gamma = \frac{Pa}{R}$$

The number N of edges 3 engaging with the part 4 equals $$N = \frac{\gamma}{\alpha} + 1$$

The condition for a constant number of edges to engage with the part 4 during the rotation about the axis 5 is therefore $$\frac{\gamma}{\alpha} = \text{integer}$$

$$=> \frac{h\,tg(\beta)}{R\,\alpha} = \text{integer}$$

A method is provided consisting of selecting the characteristics α, β and R of the milling cutter 1 on the basis of the height h of the part 4 in order for this equation to be satisfied, such that a constant number of edges engages with the part 4 during the rotation of the milling cutter 1 about the axis 5.

In other words, several embodiments relate to a milling arrangement comprising a milling cutter 1 and a part 4, which arrangement is intended for laterally milling a part 4 having a predetermined height, the characteristics of the milling cutter 1 being suitable for allowing the force of the milling cutter 1 on the part 4 to be constant over time.

The disclosed subject matter has been described in relation to specific embodiments which are purely illustrative and should not be considered to be limiting. In general terms, the claimed subject matter is not limited to the examples shown and/or described above. The use of the verbs "comprise", "include, "consist of", or any other variant, as well as the conjugations thereof, cannot in any way exclude the presence of elements other than those mentioned. The use of the indefinite article "a" or "an" or of the definite article "the" to introduce an element does not exclude the presence of a plurality of said elements. The reference signs in the claims do not limit the scope thereof.

While illustrative embodiments have been illustrated and described, it will be appreciated that various changes can be made therein without departing from the spirit and scope of the claimed subject matter.

The embodiments of the disclosure in which an exclusive property or privilege is claimed are defined as follows:

1. Method for selecting a milling cutter on the basis of a part to be machined, the milling cutter comprising:
 a cylinder having a circular cross section of radius R and having an axis of rotation;
 a plurality of cutting edges in a number M, arranged along parallel helical lines extending along an outer surface of the cylinder, the edges defining, together with the direction of the axis of the cylinder, a helix angle β, the edges enclosing constant angles α in a plane that is perpendicular to the axis such that α=360°/M;
 the method comprising:
 providing a part having a side;
 determining a height h of the side; and
 electing a milling cutter having values of α, β and R such that the following equation is satisfied:

$$\frac{tg(\beta)}{R\,\alpha} = \frac{\text{integer}}{h}.$$

2. The method of claim 1, wherein the number M of cutting edges of the milling cutter is between 1 and 10.

3. The method of claim 2, wherein the number M of cutting edges of the milling cutter is between 2 and 6.

4. The method of claim 1, wherein the helix angle β is between 10° and 80°.

5. The method of claim 4, wherein the helix angle β is between 20° and 70°.

6. Milling arrangement comprising a milling cutter and a part, said milling cutter permitting lateral milling of said part, said milling cutter comprising:

a cylinder having a circular cross section of radius R and having an axis of rotation;

a plurality of cutting edges in a number M, arranged along parallel helical lines extending along an outer surface of the cylinder, the edges defining, together with the direction of the axis of the cylinder, a helix angle β, the edges enclosing constant angles α in a plane that is perpendicular to the axis such that α=360°/M;

said part having a side facing said milling cutter that has a height h measured in parallel with the axis of the cylinder of the milling cutter, wherein the values of α, β and R satisfy the following equation:

$$\frac{tg(\beta)}{R\,\alpha} = \frac{\text{integer}}{h}.$$

7. The milling arrangement of claim 6, wherein the number M of cutting edges of the milling cutter is between 1 and 10.

8. The milling arrangement of claim 7, wherein the number M of cutting edges of the milling cutter is between 2 and 6.

9. The milling arrangement of claim 6, wherein the helix angle β is between 10° and 80°.

10. The milling arrangement of claim 9, wherein the helix angle β is between 20° and 70°.

11. The milling arrangement of claim 6, wherein the side of the part facing the milling cutter is substantially planar.

12. The milling arrangement of claim 6, wherein the side of the part facing the milling cutter is parallel to the axis.

* * * * *